(12) United States Patent
Schwarz (10) Patent No.: US 10,766,682 B2
(45) Date of Patent: Sep. 8, 2020

(54) PACKAGING CONTAINER WITH PREFORMED SEALING RING

(71) Applicant: Sonoco Development, Inc., Hartsville, SC (US)

(72) Inventor: Richard A Schwarz, Livingston, TX (US)

(73) Assignee: Sonoco Development, Inc., Hartsville, SC (US)

( * ) Notice: Subject to any disclaimer, the term of this patent is extended or adjusted under 35 U.S.C. 154(b) by 41 days.

(21) Appl. No.: 15/877,540

(22) Filed: Jan. 23, 2018

(65) Prior Publication Data

US 2019/0225401 A1 Jul. 25, 2019

(51) Int. Cl.
*B29C 65/00* (2006.01)
*B29C 65/04* (2006.01)
(Continued)

(52) U.S. Cl.
CPC .......... *B65D 77/2032* (2013.01); *B29C 65/04* (2013.01); *B65B 7/16* (2013.01); *B65B 7/164* (2013.01); *B65B 7/2878* (2013.01); *B65B 25/04* (2013.01); *B65B 61/20* (2013.01); *B65D 25/14* (2013.01); *B65D 51/245* (2013.01); *B65D 53/02* (2013.01); *B65D 77/2024* (2013.01); *B29C 65/08* (2013.01); *B29C 65/18* (2013.01); *B29C 65/486* (2013.01); *B29C 65/4815* (2013.01);
(Continued)

(58) Field of Classification Search
CPC ......... B29C 65/00; B29C 65/02; B29C 65/04; B29C 65/08; B29C 65/18; B29C 65/48; B29C 65/481; B29C 65/4815; B29C 65/486; B29C 65/50; B29C 65/5007; B29C 65/5035; B29C 65/5014; B29C 65/5057; B29C 65/76; B29C 66/00; B29C 66/53461; B29C 66/53462; B29C 66/8322; B29C 66/131; B29C 66/1142; B29C 66/242; B29C 66/24221; B29C 66/2424; B29C 66/25244; B29C 66/5344; B65D 77/2024; B65D 53/02; B32B 27/08
USPC ... 156/60, 69, 73.1, 73.2, 90, 145, 146, 196, 156/217, 242, 244.11, 245, 272.2, 273.3, 156/278, 292, 304.1, 304.2, 304.6, 308.2, 156/309.6, 324.4; 220/200, 378, 359.1, 220/359.4; 53/476, 477, 478, 484, 485, 53/285, 287, 329, 329.2, 329.3; 215/200, 215/232, 233, 234
See application file for complete search history.

(56) References Cited

U.S. PATENT DOCUMENTS

| | | | |
|---|---|---|---|
| 4,529,100 A * | 7/1985 | Ingemann | B29C 65/08 220/270 |
| 2008/0001366 A1* | 1/2008 | Gladfelter | B29C 65/02 277/575 |

(Continued)

*Primary Examiner* — Philip C Tucker
*Assistant Examiner* — Brian R Slawski
(74) *Attorney, Agent, or Firm* — Miller, Matthias & Hull LLP (57) ABSTRACT

A packaging container for holding contents such as fresh food. The container comprises a tray having a flange, a pre-formed sealing ring and a flexible film for sealing in the contents of the tray. The sealing ring is made from fiber, filament or tape ("FFT") that is shaped into a shape that matches the shape of the tray flange. The sealing ring is adhered to the tray flange by heat welding or other means and the flexible film is adhered to the sealing ring.

5 Claims, 8 Drawing Sheets

(51) Int. Cl.
*B29C 65/08* (2006.01)
*B29C 65/18* (2006.01)
*B29C 65/48* (2006.01)
*B29C 65/50* (2006.01)
*B29C 65/76* (2006.01)
*B65D 53/02* (2006.01)
*B65D 77/20* (2006.01)
*B32B 27/08* (2006.01)
*B65D 25/14* (2006.01)
*B65D 51/24* (2006.01)
*B65B 7/16* (2006.01)
*B65B 7/28* (2006.01)
*B65B 25/04* (2006.01)
*B65B 61/20* (2006.01)
*B65B 25/00* (2006.01)

(52) U.S. Cl.
CPC ...... *B29C 65/5035* (2013.01); *B29C 65/5057* (2013.01); *B29C 65/76* (2013.01); *B29C 66/1142* (2013.01); *B29C 66/131* (2013.01); *B29C 66/242* (2013.01); *B29C 66/5344* (2013.01); *B29C 66/53461* (2013.01); *B32B 27/08* (2013.01); *B65B 25/001* (2013.01)

(56) References Cited

U.S. PATENT DOCUMENTS

| | | | | |
|---|---|---|---|---|
| 2012/0024856 A1* | 2/2012 | Smyers | ............ | A47G 19/02 |
| | | | | 220/324 |
| 2012/0217244 A1* | 8/2012 | Phaneuf | ............ | B65D 53/04 |
| | | | | 220/212 |
| 2014/0166682 A1* | 6/2014 | Huffer | ............ | B65B 7/2878 |
| | | | | 220/780 |

\* cited by examiner

PACKAGING CONTAINER WITH PREFORMED SEALING RING

BACKGROUND OF THE INVENTION

Field of the Invention

This disclosure relates to packaging containers. More particularly, this disclosure relates to a packaging container for fresh food, the container comprising a tray, a pre-formed sealing ring disposed on the tray, and a flexible film for sealing the contents of the tray.

Description of the Related Art

It is becoming more common for fresh food, such as sliced fruit and vegetables, to be packaged in transparent plastic containers. The containers may comprise a plastic tray having a flange and a flexible heat sealable film that has been adhered to the flange to provide a sealed environment for the fresh food.

It is sometimes desirable to apply a sealing material to the flange which will bond to the heat sealable film. Typically this is done by co-extrusion in which the entire tray surface is covered with the sealing material.

If the sealing material can be applied selectively to the flange surface, a multitude of benefits (such as cost control, flexibility, secondary processing and custom capability) may be realized. The present disclosure is designed to achieve these and other benefits.

BRIEF SUMMARY OF THE INVENTION

The present disclosure relates to a packaging container for fresh food. The container comprises a tray having a flange, a pre-formed sealing ring and a flexible film for sealing in the contents of the tray. The sealing ring is made from plastic fiber, plastic filament or plastic tape ("FFT") that is shaped into a shape that matches the shape of the tray flange. The sealing ring is adhered to the tray flange by heat welding or other means and the flexible film is adhered to the sealing ring.

DETAILED DESCRIPTION OF THE INVENTION

While the invention described herein may be embodied in many forms, there is shown in the drawings and will herein be described in detail one or more embodiments with the understanding that this disclosure is to be considered an exemplification of the principles of the invention and is not intended to limit the disclosure to the illustrated embodiments. Aspects of the different embodiments can be combined with or substituted for one another.

The Container 12

Figure 1:
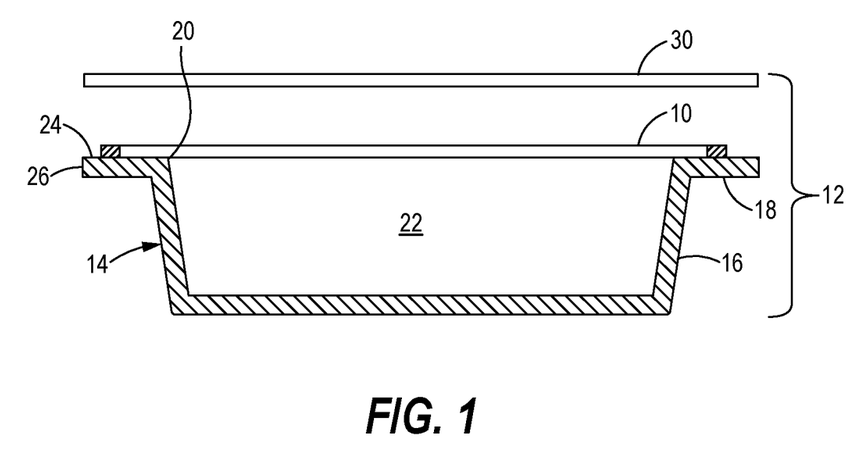
FIG. 1 is an exploded cross-sectional view of a packaging container according to the disclosure.

Turning to the drawings, where like numerals indicate like elements, there is shown in FIG. 1 is an exploded cross-sectional view of a packaging container 12 for holding food and the like according to the disclosure. The packaging container 12 may comprise a rigid tray 14, a sealing ring 10 and a flexible film 30. The rigid tray 14 may comprise a base 16 such as the tray-shaped shown in FIG. 1 and a flange 18. The base 16 has a rim 20 and defines a cavity 22 configured to receive contents therein. The flange 18 extends outwardly from the rim 20 and has an upper surface 24 and defines an outer edge 26. The upper surface 24 has a shape.

The Sealing Ring 10

Figure 2:
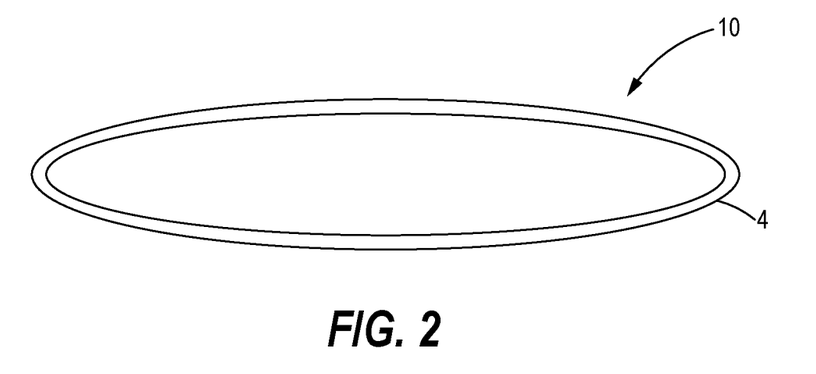
FIG. 2 is perspective view of a sealing ring according to the disclosure.

FIG. 2 is a perspective view of a sealing ring (a.k.a. gasket) 10 according to the disclosure. As noted above, the sealing ring 10 is part of the packaging container 12. The sealing ring 10 is preformed, that is, it is formed before being adhered to the tray flange 18. As explained in more detail below, one method of preforming the sealing ring 10 comprises creating a filament 4 having two ends 6, adhering the ends 6 together and shaping the filament 4 into a desired shape.

Figure 3:
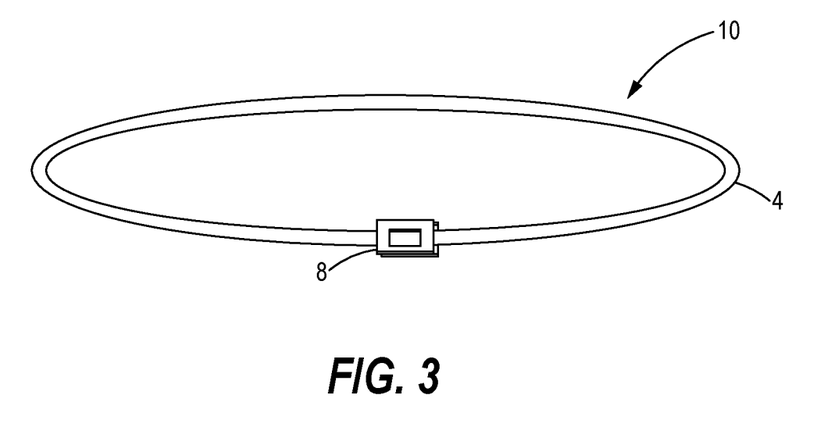
FIG. 3 is perspective view of a sealing ring with its ends being welded together.

FIG. 3 is perspective view of a sealing ring 10 with its ends 6 being welded together. The ends 6 of the filament 4 may be adhered together using any suitable means. For example, the ends 6 may be welded together by overlapping the ends 6 and then welding them together using heat. The heat for the welding may be supplied by subjecting the lapped ends 6 to a high radio frequency (RF) electric field or ultrasonic energy. The free ends 6 may also be joined using adhesive.

Figure 4:
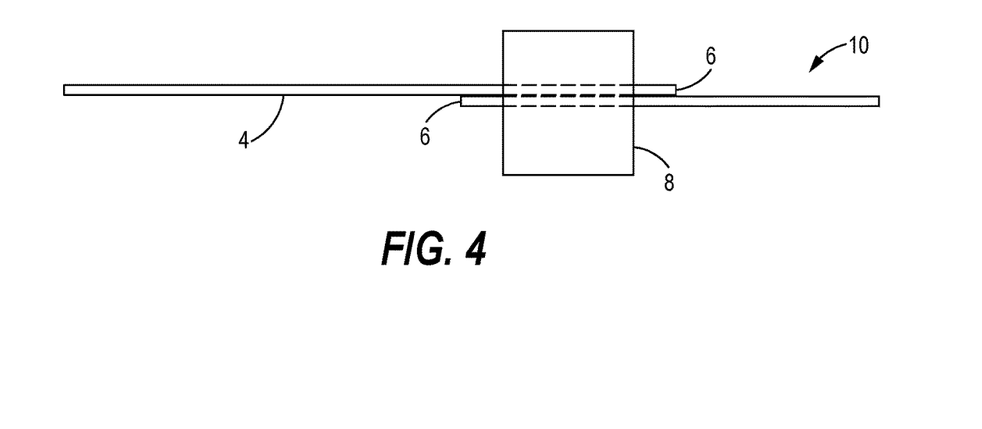
FIG. 4 is side view of a sealing ring with its ends being welded together.

FIG. 4 is close up side view of a sealing ring 10 with its ends 6 being welded together. The ends 6 may be arranged in an overlapping position by an end sealer 8 prior to being welded together.

Figure 5:
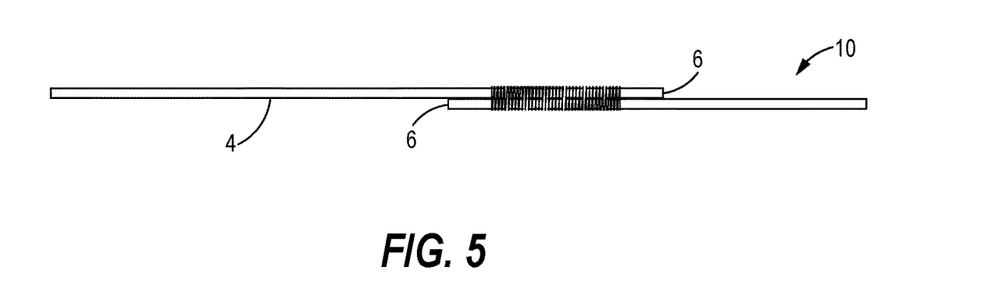
FIG. 5 is side view of the sealing ring of FIG. 4 after its ends have been welded together.

FIG. 5 is side view of the sealing ring 10 of FIG. 4 after its ends 6 have been welded together. The sealing ring 10 now has a closed configuration like that shown in FIG. 2, with no loose ends.

Applying the Sealing Ring 10 to a Tray Flange 18

Figure 6:
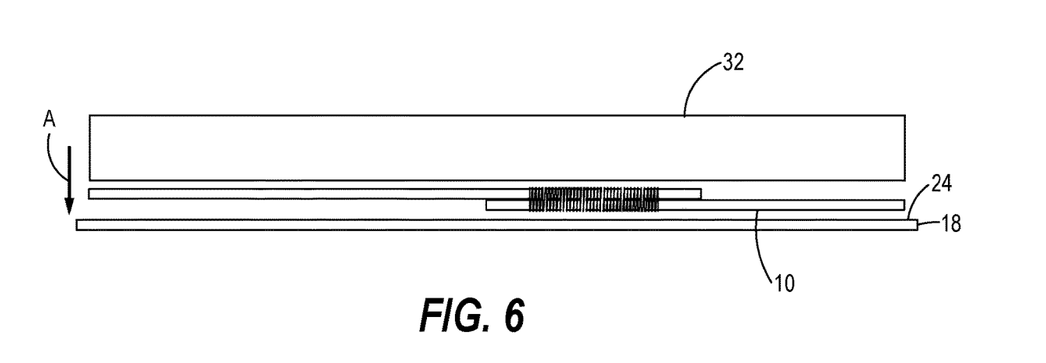
FIG. 6 is a schematic showing the sealing ring of FIG. 5 being placed onto a tray flange.

FIG. 6 is a schematic showing a sealing ring 10 being placed onto a tray flange 18 by an applicator tool 32. As explained in more detail below, the sealing ring 10 is positioned onto the upper surface 24 of the flange 18 by the applicator tool 32 as the applicator tool 32 moves downward in the direction of arrow A. Then, with the sealing 2 0 ring 10 contacting the flange 18, the sealing ring 10 is adhered to the upper surface 24 of the flange 18 by heat welding, sonic welding, adhesive or any suitable means.

The container 12 may further comprise a layer of pressure sensitive adhesive (PSA) or heat activated adhesive (HAA)

disposed on the flange upper surface 24 so that the sealing ring 10 can be adhered to the PSA or HAA.

Sealing Ring 10—Material of Construction

In a key aspect of the invention, the sealing ring 10 comprises a filament 4 made of a heat sealable material. In this disclosure the term "filament" means a fiber, a filament or a tape (collectively designated as "FFT").

The FFT filament 4 can be made of any suitable material, including without limitation, polyethylene (PE), polypropylene (PP), polyester, polyamide, ionomer, polyacrylic or modified compositions thereof which can seal to the tray flange 18 and to the flexible lidding film 30. For example, the FFT 4 may be made of polyethylene (PE) and the tray 14 may be made of polyethylene. In another example, the FFT 4 may be made of polypropylene (PP).

In still another example, the FFT composition may be a melt blend of an adhesive and the main FFT substrate (PP, PE, polyester, polyamide, etc.) in which the adhesive has an affinity for the tray flange 18 preferably or the lidding film 30 preferably, depending on whether it is desired that the sealing ring 10 stay with the tray 14 or with the flexible film 30 when the film 30 is peeled off. The sealing ring 10 can also be coated with an adhesive to accomplish a similar result plus create a re-sealable container 12.

Method of Manufacturing a Container

Figure 8:
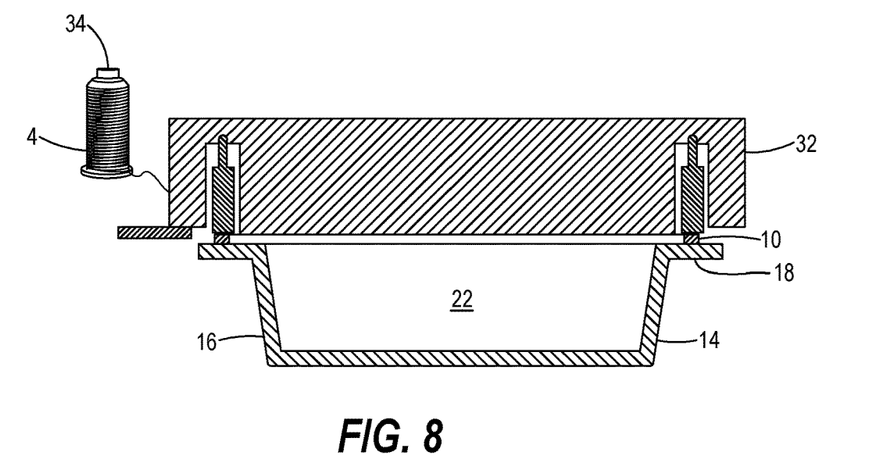
FIG. 8 is a side schematic of a sealing ring being adhered to a tray.
Figure 9:
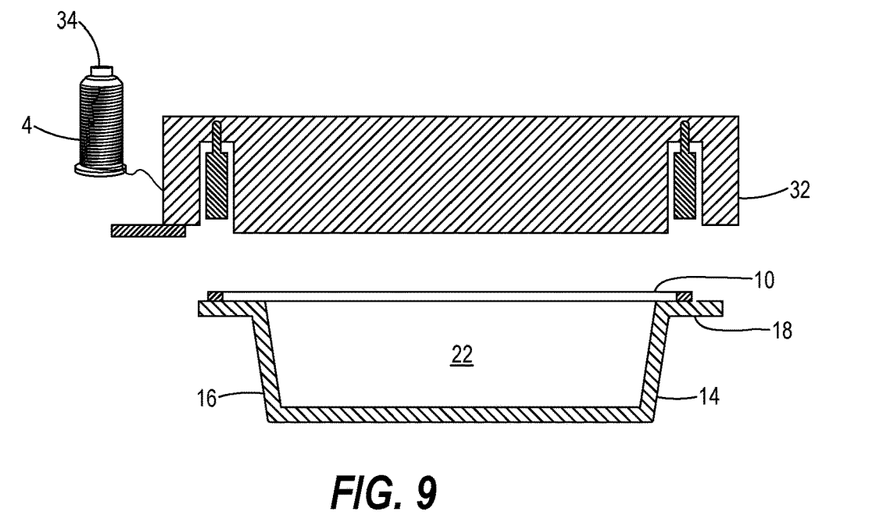
FIG. 9 is a side schematic of a tray and sealing ring.

A method 100 of manufacturing a packaging container will now be explained with references to FIGS. 7 to 9. In brief summary, the method 100 involves using fibers, filaments or tapes (FFT) to pre-form a sealing ring 10 that is then positioned onto a tray or tray 14. The method 100 may comprise the following steps or operations. The steps are numbered for easy reference, but the numbers are not meant to limit the order in which the steps are undertaken.

Step 102: Forming a rigid tray 14 comprising a base 16 and a flange 18, the base 16 having a rim 20 and defining a cavity 22 configured to receive contents therein, the flange 18 extending laterally outward from the rim 20, the flange 18 having an upper surface 24 and defining an outer edge 26. The upper surface has a shape.

Step 104: Preforming a sealing ring or sealing ring 10 from plastic fiber, filaments or tapes (FFT) into a shape conforming to the shape of the upper surface 24 of the flange 18. For example, if the upper surface 24 of flange 18 is oval, the sealing ring 10 should be similarly oval shaped.

Figure 7:
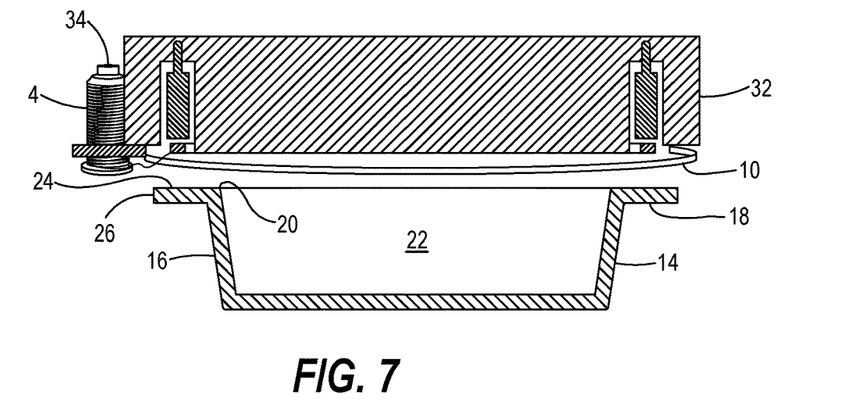
FIG. 7 is a side schematic of a sealing ring prior to being adhered to a tray.

FIG. 7 is a side schematic of a sealing ring 10 being pre-formed prior to being adhered to a tray 14. FFT filament 4 is carried on a spool 34. An orbiter (not shown) grasps the filament 4 and orbits about the applicator tool 32 until the orbiter reaches its starting location where the filament ends 6 overlap slightly. The filament 4 is arranged into a desired shape (such as an oval or circle) and cut to the appropriate length, creating two ends 6. A sealer 8 (not shown in FIG. 7) engages and seals the two ends 6 and then retracts. The ends 6 are welded together to form the sealing ring 10. The preforming process may be repeated as many times as desired to create as many sealing rings 10 as desired.

Step 106: Positioning the sealing ring 10 onto the upper surface 24 of the flange 18. FIG. 8 is a side schematic of a sealing ring 10 being positioned onto a tray 14 by the applicator tool 32. The tool 32 may reciprocate between the lower position shown in FIG. 8, in which the finished sealing ring 10 contacts the tray flange 18, and the raised position shown in FIG. 7.

Step 108: Adhering the sealing ring 10 to the flange 18. While the tool 32 is in the lower position shown in FIG. 8 the sealing ring 10 may be adhered to the upper surface 24 of the flange 18 by heat welding, sonic welding or any suitable means. After the sealing ring 10 is adhered to the flange 18 the applicator tool 32 moves into the raised position shown in FIG. 9. The applicator tool 32 is then ready to receive the next filament 4. During this step, the orbiter may grasp an exposed end of the filament 4 remaining on the spool 34 and be ready to orbit the next tray 14. The tray 14 is ready to move to another station where it can be filled with content prior to being sealed with a film 30.

Step 110: The method may comprise the additional step of attaching a flexible film 30 onto the sealing ring 10 to cover and enclose the cavity 22. After the contents have been placed into the cavity 22, a flexible film 30 may be hermetically secured to the sealing ring 10 to enclose the cavity 22. At least a portion of the flexible film 30 may be adapted to be peeled away from the sealing ring 10 to provide access to the contents.

Figure 10:
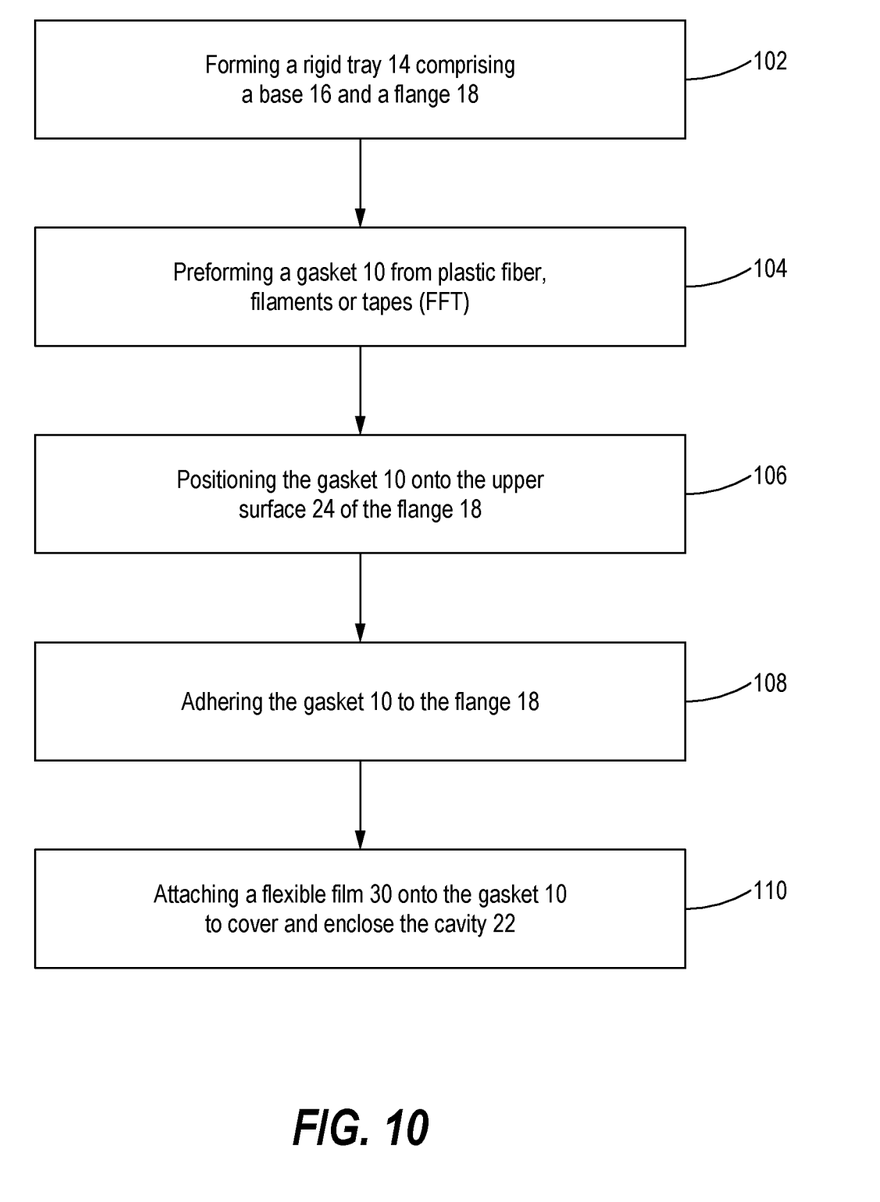
FIG. 10 is a flow diagram of a process of manufacturing a food container.

FIG. 10 is a flow diagram of the process described above. In one possible scenario, the package manufacturer does every step except step 110, sealing the flexible lidding film 30 to the tray 14, which could be done by the product maker after the container 12 is filled with product.

Coating the Sealing Ring 10 and/or Tray 14

The method may comprise the additional step of coating the sealing ring 10 and/or tray 14 with a coating adapted to enhance a shelf life of the contents or improve adherence of the flexible film 30 to the sealing ring 10. The coating may be disposed onto at least a portion of the tray 14.

Process Schematics

Figure 11:
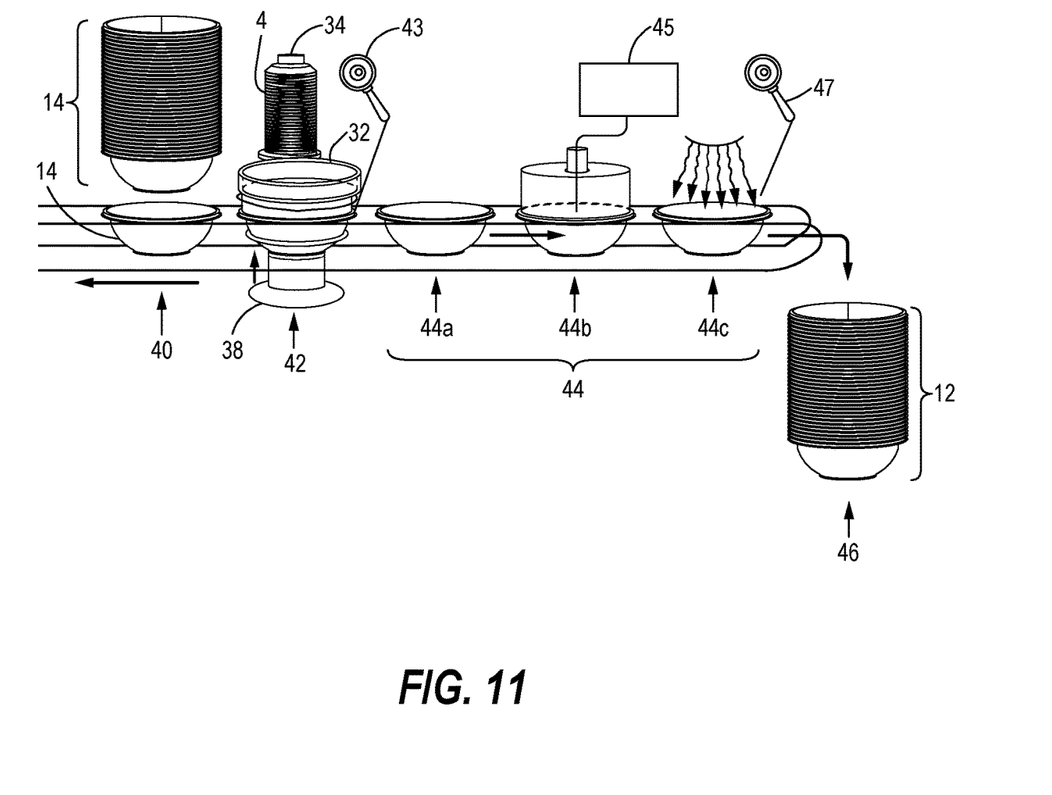
FIG. 11 is a schematic of a process of manufacturing a food container.

FIG. 11 is a schematic of a process of manufacturing a food container 12 showing one possible arrangement of operating stations.

Feeding Station 40: Starting at the left of the figure, a stack of trays 14 is fed to a sealing station 42. The trays 14 may have any reasonable shape and diameter. The trays 14 may be fed to a moving belt 36 one at a time.

Sealing Station 42: Still reading from left to right, the tray 14 is moved to a sealing station 42 where a sealing ring 10 is pre-formed, positioned onto the tray flange 18 and heat sealed thereto. An auxiliary tool 38 may press the tray 14 into the applicator tool 32 to help position and seal the sealing ring 10 to the tray 14. The finished tray 14 and sealing ring 10 may undergo a visual inspection 43 during or after this step.

Coating Station 44: The next three illustrations depict what may occur after the tray 14 and sealing ring 10 have moved to a coating station 44. In the first illustration 44a the inside surface of the tray 14 is treated, such as by flame and corona ionization. In the second illustration 44b, the inside surface of the tray 14 is coated with a coating supplied by a coating reservoir 45. The coating may be achieved by any suitable means, including spray coating and charged particle coating. In the third illustration 44c the coating is cured, such as with air and heat. Both the tray 14 and the sealing ring 10 are exposed to air and heat. Another visual inspection 47 may occur during or after this step.

Since the trays 14 need to be handled separately to place the sealing flange 10 on them, it is convenient and value-adding to include the coating step. Coatings can include but aren't limited to: oxygen barrier, oxygen absorption, antimicrobial, visual appeal, indicators for quality, spoilage, branding, moisture control, antifogging, moisture barrier, and temperature history for distribution and consumer storage at home. The surface treatment of the inside of the tray 14 can also encourage full coverage or target a well-defined target space by directing a charge at a specific site and then coating that site with an opposite charged coating. For example, a coating meant to indicate temperature history or spoilage may be targeted near the product label which will have an arrow pointing to the indicator. That way the entire surface does not have to be coated, thus saving cost and minimizing exposure to the food. Benefits from having such coatings include reduced food waste, food safety, consumer reassurance, consumer interest, clearer view of the product.

The coating process illustrated schematically in FIG. 10, while it uses a round tray 14 as an example, can be adapted to be used with any shaped flange sealing surface, such as rectangular or oval. While some coating may imply a transparent container is required, any color container can be used for other coatings, depending on function.

Stacking Station 46: Finally, the finished tray 14 continues on the moving belt 36 to a stacking station for packing.

Figure 12:
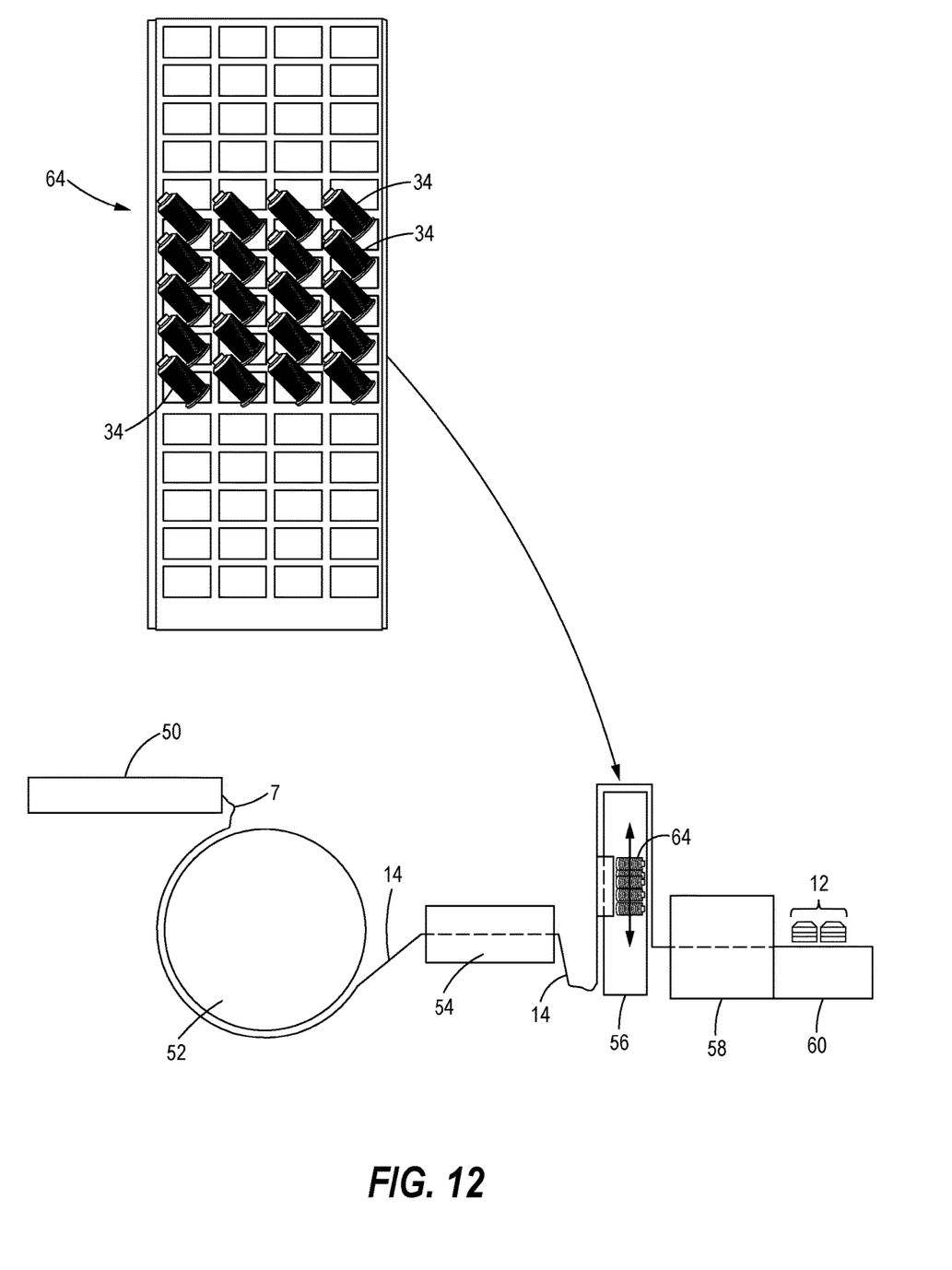
FIG. 12 is a schematic of an in-line process for applying a sealing filament to a flange.

FIG. 12 is a schematic of one possible in-line process to apply an FFT filament 4 to a flange 18 to create a packaging container 12. In-line is defined as a process, whether using flat bed or rotary (wheel) forming, in the operation of making trays 14, after which the FFT filament 4 is applied to the tray 14. The process may utilize an extruder 50, a rotary former 52, a take-off 54, an accumulator 56, a trim press 58, a packing station 60 and an FFT unwinder/supply lattice 64.

The extruder 50 extrudes a sheet 7 that is used to make the trays 14. The sheet 7 may be made of any suitable thermoplastic material, such as polyethylene.

The sheet 7 is fed to a thermoformer such as the rotary (wheel) thermoformer 52 shown in the figure or a flat bed thermoformer. The thermoformer 52 forms the sheet into the desired shape, such as the bowl-shaped tray 14 shown in FIG. 11. The trays 14 may be untrimmed after this stage.

The take off 54 takes the untrimmed formed trays 14 from the thermoformer 52 and delivers them to accumulator 56.

The accumulator 56 typically is used to stop or pause part of the process while allowing the rest of the process to run continuously. It is at this stage that the FFT filament 4 is applied to the tray flange 18. The accumulator 56 may include the applicator tool 32 (not shown in the figure) and the FFT unwinder/structural lattice 64 shown in the top portion of FIG. 12, in addition to other FFT application hardware and materials. The accumulator 56 should include means for stabilization of the trays 14 so they can accept the FFT filament 4 in a precision placement.

The FFT unwinder/structural lattice 64 holds spools 34 of filament 4. In the figure the filament 4 is stored in a five by four matrix of spools 34. The spooled filament 4 is ready to be pre-formed into sealing rings 10 and applied to trays 14.

If the FFT filament 4 is made by a package manufacturer, the spools 34 may be used internally by the packaging manufacturer to make the containers 12. Alternatively, if the FFT filament 4 is made by a separate manufacturer, the package manufacturer may purchase the FFT filament 4 and use it to make the containers 12. In either case, the FFT filament 4 may be stored until needed.

The trim press 58 is used to trim the container 12 after the filament 4 has been applied to the tray 14 before the container 12 is sent to the packaging station 60. Eventually the trays 14 will be filled and sealed with a flexible film 30.

Figure 13:
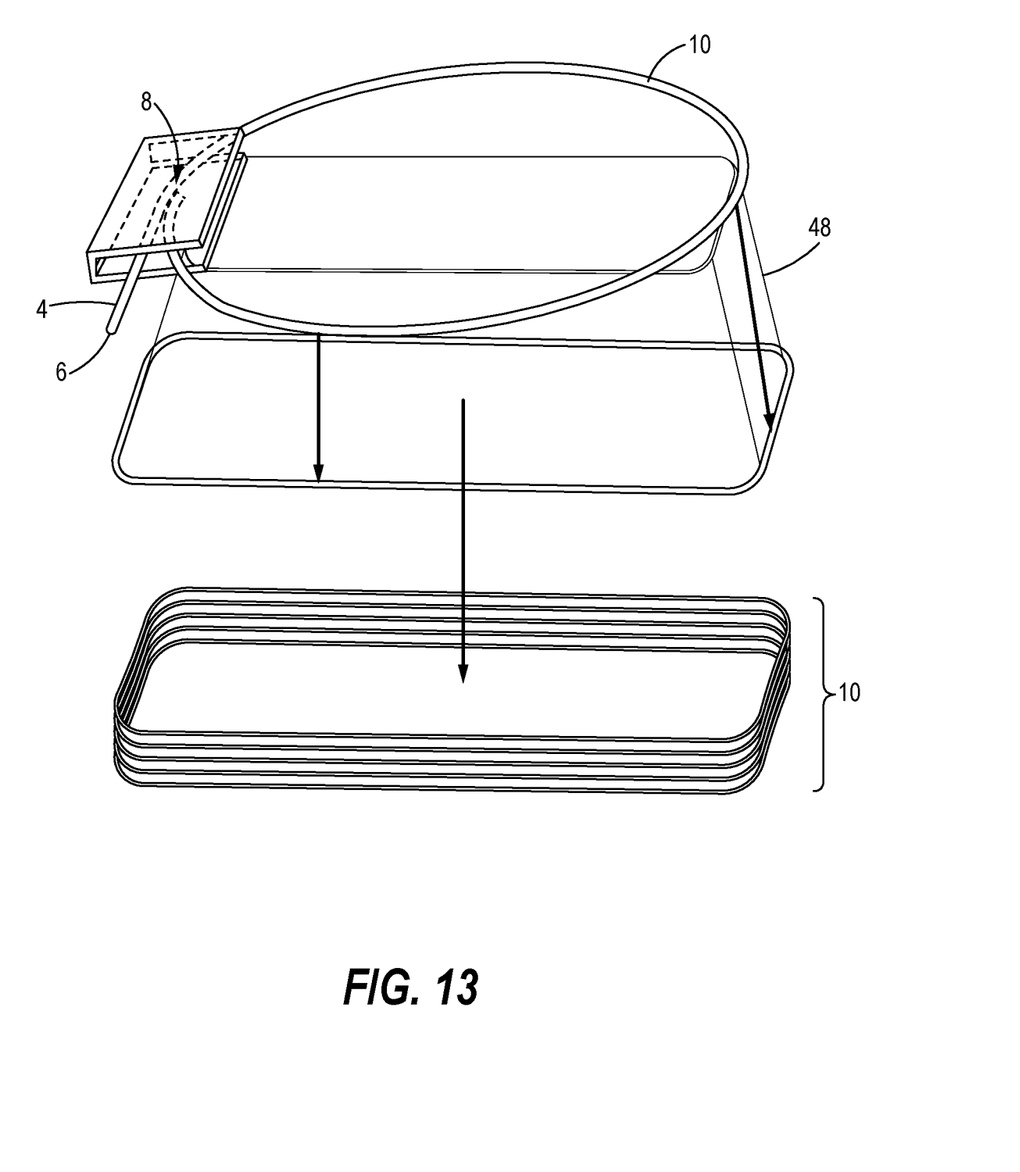
FIG. 13 is a schematic of a sealing ring being pre-formed, including being shaped into a generally rectangular shape.

FIG. 13 is a schematic of a sealing ring 10 being preformed, including being shaped into a generally rectangular shape. Filament 4 may be fed from a spool 34 (not shown) and cut to an appropriate length. The ends 6 of a cut filament 4 are sealed together by end sealer 8. The resulting sealing ring 10 may be shaped by a shaping form 48 into a desired shape. In this case, the desired shape is rectangular with slightly rounded corners. The sealing ring 10 may be substantially flat in the vertical dimension in order to lay flat against a flat flange 18. Heat and pressure may be applied to the sealing ring 10 during the shaping operation. A stack of sealing rings 10 is shown at the bottom of FIG. 13, waiting to be applied to tray flanges 18.

Near Field Communication (NFC) Chip 62

Figure 14:
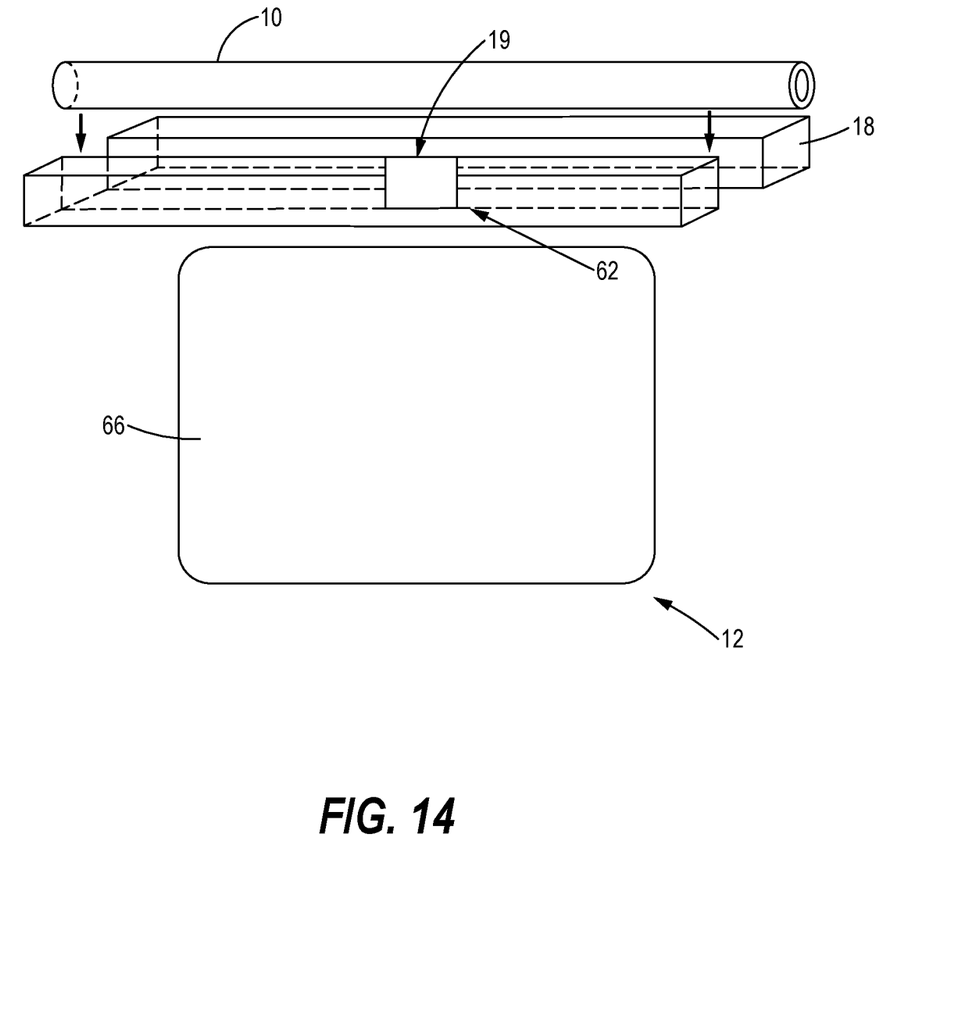
FIG. 14 is a schematic diagram of a container having a near field communication (NFC) chip embedded into or onto the flange.

FIG. 14 is a schematic diagram of a container 12 have a near field communication (NFC) chip 62 embedded into or onto the flange 18. The near field communication chip 62 may be placed in a molded-in groove or recess 19 defined by the flange 18 and held in place with the sealing ring 10. Alternatively, the near field communication (NFC) chip 62 may be embedded into the sealing ring 10, preferably during the sealing ring formation step. The sealing ring 10 may stay with the flexible film 30 for recycling purposes. The container 12 may include an appropriate label 66.

INDUSTRIAL APPLICABILITY

The container described herein is suitable for many uses, especially for containers for holding fresh foods. The container and method described herein may provide numerous benefits, including:

Cleaner application using a preformed sealing ring 10 verses applying emulsions and hot glues to the tray flange 18.

Sealing rings 10 can be made ahead of time for application later.

Fibers, filaments and tapes (FFT) are flexible, made from most plastics of interest and readily available.

Spools 34 can carry long lengths of FFT filament 4 and can be used readily on a batch basis, or the end of one spool 34 can be spliced with the beginning of the next spool 34 to insure continuous operation.

FFT filament 4 can be heat sealed to itself and well as to the tray 14.

The preformed sealing ring 10 can be stuffed into a molded-in groove 19 on the tray flange 18 and sealed for aesthetics, precision and controlled release of the sealing ring 10 with the flexible film 30.

FFT filament 4 flexibility allows application to any flange upper surface 24 geometry with relatively simple engineering.

Waste is minimized.

FFT filament 4 can be selected to peel from the tray 14 when the film 30 is removed for recycling, or stay with the tray 14 while the film 30 is removed.

FFT filament 4, if properly modified, can be colored to indicate tampering, contain an oxygen scavenger, indicate proper sealing through color generation, ensure product authenticity, or indicate food spoilage. The filament 4 can be recyclable without the need to remove it from a spent tray 14.

FFT filament 4 controls costs of the tray 14, especially when the special features described herein are incorporated.

Relatively simple application tool 32 and other need equipment can be made at reasonable cost.

Batch process of this technology allows for modular production increases to match needs.

A sealing surface can be applied to crystalline polyethylene terephthalate (CPET) trays 14 without compromising frozen impact resistance, inherent to the co-extrusion process to apply an entire heat sealable layer.

An in-line process to apply sealing rings 10 is possible.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A method of manufacturing a filled container, the method comprising the steps of:
 (a) forming a rigid tray comprising a base and a flange, the base having a rim and defining a cavity configured to receive contents therein, the flange extending radially outward from the rim, the flange having an upper surface, the upper surface having a shape;
 (b) providing a filament made of a heat sealable material;
 (c) preforming a sealing ring by feeding the filament from a spool, grasping the filament with an orbiter that orbits about an applicator tool until the filament overlaps itself, cutting the filament to create two ends, and welding the two ends together;
 (d) positioning the sealing ring onto the upper surface of the flange;
 (e) adhering the sealing ring to the flange;
 (f) filling at least part of the cavity with the contents;
 (g) applying a flexible film onto the sealing ring to cover and enclose the cavity; and
 (h) adhering the flexible film to the sealing ring by heat welding.

2. The method of claim 1 wherein:
the filament is a melt blend of an adhesive and a polyolefin selected from the group consisting of polyethylene (PE), polypropylene (PP) and compositions thereof.

3. The method of claim 1 wherein:
the filament comprises a blend of an adhesive and a substrate in which the adhesive has an affinity for the flange.

4. The method of claim 1 wherein:
the filament comprises a blend of an adhesive and a substrate in which the adhesive has an affinity for the flexible film.

5. The method of claim 1 wherein:
at least a portion of the flexible film is adapted to be peeled away from the sealing ring to provide access to the contents.

* * * * *